United States Patent Office 3,397,205
Patented Aug. 13, 1968

3,397,205
ARYL-1,3,5-TRIAZINES
Christian Luethi, Munchenstein, Hans Rudolf Biland, Basel, and Max Duennenberger, Frenkendorf, Basel-Land, Switzerland, assignors to Ciba Limited, Basel, Switzerland, a Swiss company
No Drawing. Filed Feb. 8, 1966, Ser. No. 525,856
Claims priority, application Switzerland, Feb. 19, 1965, 2,312/65
11 Claims. (Cl. 260—248)

ABSTRACT OF THE DISCLOSURE

New aryl-1,3,5-triazines are provided which may be represented by the formula

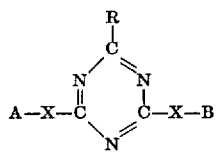

where R represents a possibly substituted 6-membered aromatic ring system which contains a hydroxyl group in ortho-position to the bond with the triazine ring and which may be annellated with a further 5-membered or 6-membered aromatic ring system and is bound with the triazine ring through a carbon atom; X represents a divalent hetero atom grouping such as —O—, —S— or —NQ— (in which Q stands for a hydrogen atom or a lower aliphatic radical bound through a carbon atom with nitrogen); A and B each represents an alkyl, alkenyl, cycloalkyl, aralkyl, phenyl or naphthyl group which contains up to 20 carbon atoms and, if desired, these groups may be further substituted.

The compounds of this invention are especially useful as stabilizers to conteract the effects of light, atmospheric oxygen and heat on certain high molecular weight organic materials.

---

The present invention provides valuable, new aryl-1,3,5-triazines containing the structural element of the formula (1)

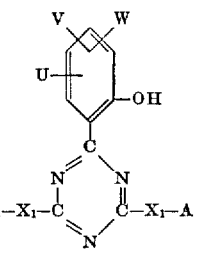

where X represents a divalent hetero atom grouping such as —O—, —S— or —NQ— (in which Q stands for a hydrogen atom or a lower aliphatic radical) and Ar represents an aromatic ring system which contains a free hydroxyl group in ortho-position to the bond with the triazine ring.

Thus, the aryl-1,3,5-triazines of the present invention correspond generally to the formula (2)

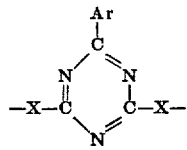

where R represents a possibly substituted 6-membered aromatic ring system which contains a hydroxyl group in ortho-position to the bond with the triazine ring and which may be annellated with a further 5-membered or 6-membered aromatic ring system and is bound with the triazine ring though a carbon atom; X represents a divalent hetero atom grouping such as —O—, —S— or —NQ— (in which Q stands for a hydrogen atom or a lower aliphatic radical bound through a carbon atom with nitrogen); A and B each represents an alkyl, alkenyl, cycloalkyl, aralkyl, phenyl or napthyl group which contains up to 20 carbon atoms and, if desired, these groups may be further substituted.

Valuable compounds as defined by the Formula 2 are above all those aryl-1,3,5-triazines which correspond to the formula (3)

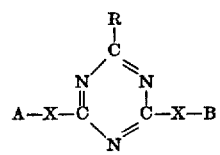

where A represents an alkyl, alkenyl, cycloalkyl, aralkyl, phenyl or naphthyl group containing up to 20 carbon atoms, and each of these groups may be further substituted; $X_1$ represents an —O—, —S— or —NH— grouping; W represents a hydrogen atom, a halogen atom, an alkyl group or a phenyl group, and U and V are identical or different substituents from the group comprising a hydrogen atom, a halogen atom, an alkyl group or the group —O—$R_1$, where $R_1$ stands for a hydrogen atom, an alkenyl group containing up to 9 carbon atoms, a possibly further substituted alkyl group, an aralkyl group or a residue of the formula

where $n=1$ or 2 and $D_1$ represents an alkyl or cycloalkyl group or a possibly further substituted phenyl group.

Among the compounds defined by the Formula 3 those are of importance in which the symbols U, V and W represent alkyl groups containing 1 to 6 carbon atoms and halogen atoms such as chlorine or bromine.

A valuable variant of compounds of the type referred to above may be represented by the formula (4)

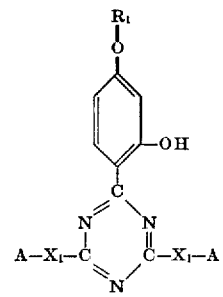

where $R_1$ represents a hydrogen atom, an alkenyl group containing up to 9 carbon atoms, a possibly further substituted alkyl group, an aralkyl group or a residue of the formula

where $n=1$ or 2 and $D_1$ stands for an alkyl or cycloalkyl group or a possibly further substituted phenyl group; $X_1$ represents an —O—, —S— or —NH— grouping; A represents an alkyl, alkenyl, cycloalkyl, aralkyl, phenyl or naphthyl group containing up to 20 carbon atoms, and each of these groups may be further substituted.

The most important group of compounds corresponding to the above general formulae includes those in which the residue A or $A_1$ is bound with the triazine ring through oxygen atoms, that is to say those of the Formulae 5a, b, c:

(5a)

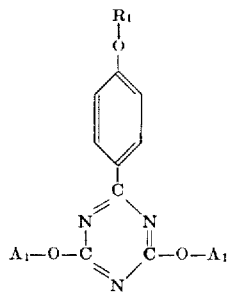

where $R_1$ has the same meaning as in the Formula 4 and $A_1$ represents a phenyl group which may be substituted by one or several halogen atoms (preferably chlorine or bromine) or by alkyl or alkoxy groups containing up to 12 carbon atoms. The substituents $—OR_1$ is in most cases a hydroxyl group, an alkoxy group containing up to 18 carbon atoms, an allyloxy or a benzyloxy group.

Of special value are above all symmetrical triazine derivatives, that is to say those carrying identical substituents in positions 3 and 5, corresponding to the formula (5b)

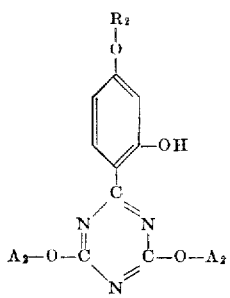

where $R_2$ represents a hydrogen atom, an alkenyl group containing up to 4 carbon atoms, a benzyl group, an alkyl group containing up to 18 carbon atoms which may contain halogen atoms, nitrile groups or carboxylic acid alkyl ($C_1$ to $C_4$) ester groups as substituents, or a residue of the formula

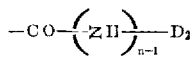

where $n=1$ or 2 and $D_2$ represents an alkyl group containing 1 to 18 carbon atoms or a phenyl group which latter may be substituted by halogen atoms or by alkyl groups containing 1 to 4 carbon atoms, and where $A_2$ represents a methyl group or a benzene residue which may contain one or two alkyl groups comprising 1 to 6 carbon atoms, up to 3 halogen atoms and a hydroxyl group. Specifically interesting compounds correspond to the formula (5c)

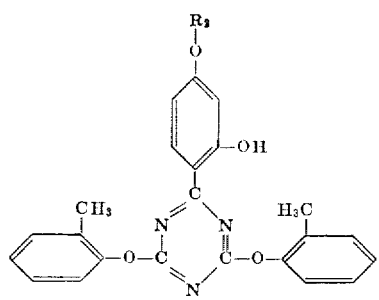

where $R_2$ represents a hydrogen atom, an alkenyl group containing up to 4 carbon atoms, a benzyl group, an alkyl group with up to 18 carbon atoms which may be substituted by halogen atoms, nitrile groups or carboxylic acid alkyl ($C_1$ to $C_4$) ester groups or a residue of the formula

where $n=1$ or 2 and $D_2$ represents an alkyl group comprising 1 to 18 carbon atoms or a phenyl group which latter may be substituted by halogen atoms or alkyl groups comprising 1 to 4 carbon atoms, or of the formula (5d)

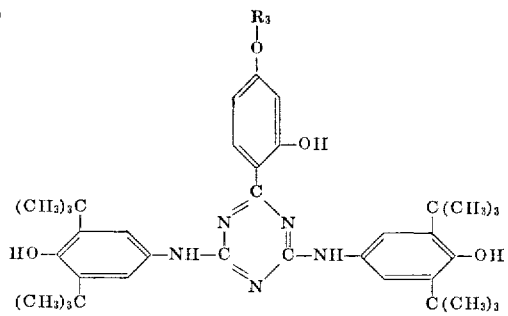

where $R_3$ represents a hydrogen atom or an alkyl group containing 1 to 4 carbon atoms.

Further variants are compounds of the formulae (6)

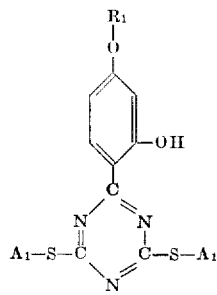

and (7)

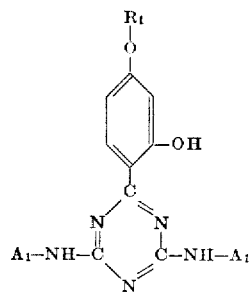

in which $R_1$ and $A_1$ have the meanings defined above.

As examples of the types of compounds referred to above there may be mentioned triazine derivatives in which R in the Formula 2 stands for a residue of the formula

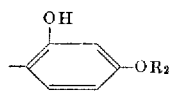

where $R_2$ represents a hydrogen atom, an alkyl group containing up to 18 carbon atoms (which may be further substituted by a chlorine atom, a hydroxyl, cyano, carboxyl, carbalkoxy or carbamyl group) such as ethyl, dodecyl, octadecyl, $—CH_2—CH_2—CH_2—Cl$, $—CH_2—CH_2—OH$, $—CH_2—CH_2—CH_2—CH_2—OH$ $—CH_2—CH_2—CH_2—CN$, $—CH_2—COOH$ $—CH_2—(CH_2)_9—COOH$, $—CH_2—COOCH_3$ $—CH_2—CH_2—CH_2—COOC_2H_5$, $—CH_2—CONH_2$ or $—CH_2—(CH_2)_9—CONH_2$, an aralkyl or alkylenyl group containing up to 9 carbon atoms such as benzyl, parachlorobenzyl, para - methylbenzyl, para - methoxybenzyl, phenylpropyl, —CH$_2$—CO—C$_6$H$_5$, allyl or crotyl, or a residue of the formula

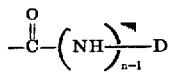

where $n=1$ or 2 and D stands for an alkyl group containing up to 18 carbon atoms, such as ethyl, octyl or octadecyl, or a phenyl radical which may be substituted by a chlorine atom, a phenyl or hydroxyl group or by an alkyl or alkoxy group containing up to 8 carbon atoms, such as phenyl, para - chlorophenyl, para - phenylphenyl, ortho - hydroxyphenyl, para - methylphenyl, para - octylphenyl, para - tertiary butoxyphenyl or para - methoxyphenyl. A preferred residue D is an alkyl group containing up to 12 carbon atoms or a phenyl group which may be further substituted by a chlorine atom or a hydroxyl group.

Particularly valuable is a residue R of the formula

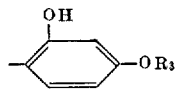

where R$_3$ represents a hydrogen atom, an alkyl group containing up to 12 carbon atoms, a hydroxyalkyl, cyanoalkyl, carboxyalkyl, carbalkoxyalkyl group or an alkenyl group containing up to 4 carbon atoms, or a benzyl group which may be substituted by a chlorine atom.

As examples of preferred residues R there may be mentioned 2',4'-dihydroxyphenyl, 2'-hydroxy - 4' - alkoxyphenyl, 2-hydroxyphenyl, 2'-hydroxy - 4' - acylhydroxyphenyl and 2'-hydroxynaphthyl.

Preferred residues A and B in the Formula 2 are above all, for example, alkyl groups containing up to 18 carbon atoms, such as methyl, octyl or octadecyl, alkenyl groups, especially those which contain up to 4 carbon atoms, for example allyl groups, phenylalkyl or alkoxyalkyl groups containing up to 12 carbon atoms, such as benzyl, parachlorobenzyl, phenylpropyl, CH$_3$—O—CH$_2$—CH$_2$— or

CH$_3$—CH$_2$—CH$_2$—CH$_2$—O—CH$_2$—CH$_2$ benzene residues of the formula

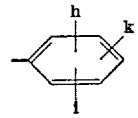

where $h$ and $k$ are identical or different and each represents a hydrogen atom, a halogen atom, a carboxyl group or an alkyl group containing up to 12 carbon atoms; $i$ represents a hydrogen atom, a halogen atom, an alkyl or phenylalkyl group containing up to 12 carbon atoms, or a hydroxyl, carboxyl, carbamyl, nitro, amino, phenyl or cyclohexyl group or an alkylamino, carbalkoxy, alkoxy or alkenyl group containing up to 8 carbon atoms. As examples of such benzene residues there may be mentioned phenyl, 4-hydroxy-3,5-di-tertiary butylphenyl, 2- methylphenyl, 4-nonylphenyl, 2 - methyl-5-isopropylphenyl, 2,4-di-tertiary butylphenyl, 2-methoxyphenyl, 2,4,6-tricarboxyphenyl, 4-carbethoxyphenyl, 3 - diethylaminophenyl, 2-carbaminophenyl, 2,4,5-trichlorophenyl, 2,4,6 - tribromophenyl, 4-chloro-3,5-dimethylphenyl, 3-nitrophenyl, 3-aminophenyl, 4-cyclohexylphenyl, 4-phenylphenyl and cumyl.

Of special value are compounds of the Formula 2 where A and B each represents a hydrogen atom, an alkyl group containing up to 12 carbon atoms or a benzene residue of the formula

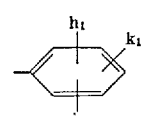

where $h_1$ and $k_1$ are identical or different and each represents a hydrogen, chlorine or bromine atom or an alkyl group containing up to 9 carbon atoms, and $i_1$ represents a hydrogen, chlorine or bromine atom, a hydroxyl, carbamyl, phenyl or cyclohexyl group or an alkoxy or alkenyl group containing up to 4 carbon atoms.

As examples of compounds of this invention or accessible by the present process there may be mentioned triazine derivatives in which the symbols —R, —X—A and —X—B represent the following substituents:

| No. | —R | —X—A | —X—B |
|---|---|---|---|
| 8 | ![]—OH, OH | —O—![]—CH$_3$ | —O—![]—CH$_3$ |
| 9 | ![]—O—C$_3$H$_5$, OH | —O—![]—CH$_3$ | —O—![]—CH$_3$ |
| 10 | ![]—OH, OH | —O—![]—C(CH$_3$)$_3$ | —O—![]—C(CH$_3$)$_3$ |
| 11 | ![]—O—C$_2$H$_5$, OH | —O—![]—C(CH$_3$)$_3$ | —O—![]—C(CH$_3$)$_3$ |
| 12 | ![]—OH, OH | —O—![]—Cl (CH$_3$) | —O—![]—Cl (CH$_3$) |
| 13 | ![]—O—C$_2$H$_5$, OH | —O—![]—Cl (CH$_3$) | —O—![]—Cl (CH) |
| 14 | ![]—OH, OH | —O—CH$_3$ | —O—![] |

| No. | −R | −X−A | −X−B |
|---|---|---|---|
| 15 | −C₆H₃(OH)₂ (−OH, −OH) | −O−C₆H₄−OCH₃ | −O−C₆H₄−OCH₃ |
| 16 | −C₆H₃(OC₂H₅)(OH) | −O−C₆H₄−OCH₃ | −O−C₆H₄−OCH₃ |
| 17 | −C₆H₃(OH)₂ | −O−C₆H₂(CH₃)₂−Cl | −O−C₆H₂(CH₃)₂−Cl |
| 18 | −C₆H₃(OC₂H₅)(OH) | −O−C₆H₂(CH₃)₂−Cl | −O−C₆H₂(CH₃)₂−Cl |
| 19 | −C₆H₃(OH)₂ | −O−C₆H₄−Cl | −O−C₆H₄−Cl |
| 20 | −C₆H₃(OC₂H₅)(OH) | −O−C₆H₄−Cl | −O−C₆H₄−Cl |
| 21 | −C₆H₃(OH)₂ | −O−C₆H₄−CH₃ | −O−C₆H₄−CH₃ |
| 22 | −C₆H₃(OC₂H₅)(OH) | −O−C₆H₄−CH₃ | −O−C₆H₄−CH₃ |
| 23 | −C₆H₃(OH)₂ | −O−C₆H₅ | −O−C₆H₅ |
| 24 | −C₆H₃(OH)(OC₂H₅) | −O−C₆H₅ | −O−C₆H₅ |
| 25 | −C₆H₃(OH)₂ | −O−CH₃ | −O−CH₃ |
| 26 | −C₆H₃(OH)₂ | −S−C₆H₅ | −S−C₆H₅ |
| 27 | −C₆H₃(OH)₂ | −O−C₆H₃Cl₂ | −O−C₆H₃Cl₂ |
| 28 | −C₆H₃(OH)₂ | −O−C₆H₄−Br | −O−C₆H₄−Br |
| 29 | −C₆H₃(OH)₂ | −O−C₆H₃Br₂ | −O−C₆H₃Br₂ |
| 30 | −C₆H₃(OH)₂ | −O−C₆H₂Br₃ | −O−C₆H₂Br₃ |

| No. | —R | —X—A | —X—B |
|---|---|---|---|
| 31 | 4-OH-C₆H₃—O—C₂H₅ | —S—C₆H₅ | —S—C₆H₅ |
| 32 | 4-OH-C₆H₃—O—(CH₂)₇—CH₃ | —S—C₆H₅ | —S—C₆H₅ |
| 33 | 4-OH-C₆H₃—O—(CH₂)₁₇—CH₃ | —S—C₆H₅ | —S—C₆H₅ |
| 34 | 4-OH-C₆H₃—O—CH₂—CH=CH₂ | —S—C₆H₅ | —S—C₆H₅ |
| 35 | 4-OH-C₆H₃—O—CH₂—C₆H₅ | —S—C₆H₅ | —S—C₆H₅ |
| 36 | 4-OH-C₆H₃—O—CH₂—C(=O)—OC₂H₅ | —S—C₆H₅ | —S—C₆H₅ |
| 37 | 4-OH-C₆H₃—O—C(=O)—CH₃ | —S—C₆H₅ | —S—C₆H₅ |
| 38 | 4-OH-C₆H₃—O—C(=O)—C₆H₅ | —S—C₆H₅ | —S—C₆H₅ |
| 39 | 4-OH-C₆H₃—O—(CH₂)₃—CH₃ | —O—C₆H₄—C(CH₃)₃ | —O—C₆H₄—C(CH₃)₃ |
| 40 | 4-OH-C₆H₃—O—(CH₂)₇—CH₃ | —O—C₆H₄—C(CH₃)₃ | —O—C₆H₄—C(CH₃)₃ |
| 41 | 4-OH-C₆H₃—O—(CH₂)₁₇—CH₃ | —O—C₆H₄—C(CH₃)₃ | —O—C₆H₄—C(CH₃)₃ |
| 42 | 4-OH-C₆H₃—O—CH₂—CH=CH₂ | —O—C₆H₄—C(CH₃)₃ | —O—C₆H₄—C(CH₃)₃ |
| 43 | 4-OH-C₆H₃—O—C₂H₅ | —NH—(CH₂)₇—CH₃ | —NH—(CH₂)₇—CH₃ |
| 44 | 4-OH-C₆H₃—O—(CH₂)₃—CH₃ | —NH—(CH₂)₇—CH₃ | —NH—(CH₂)₇—CH₃ |
| 45 | 4-OH-C₆H₃—O—(CH₂)₇—CH₃ | —NH—(CH₂)₇—CH₃ | —NH—(CH₂)₇—CH₃ |
| 46 | 4-OH-C₆H₃—O—(CH₂)₁₇—CH₃ | —NH—(CH₂)₇—CH₃ | —NH—(CH₂)₇—CH₃ |
| 47 | 4-OH-C₆H₃—O—CH₂—C₆H₅ | —NH—(CH₂)₇—CH₃ | —NH—(CH₂)₇—CH₃ |

| No. | —R | —X—A | —X—B |
|---|---|---|---|
| 48 | 4-OH, 1-O—CH₂—CH=CH₂ phenyl | —NH—(CH₂)₇—CH₃ | —NH—(CH₂)₇—CH₃ |
| 49 | 4-OH, 1-O—CH₂—C(=O)OC₂H₅ phenyl | —NH—(CH₂)₇—CH₃ | —NH—(CH₂)₇—CH₃ |
| 50 | 4-OH, 1-O—C(=O)—CH₃ phenyl | —NH—(CH₂)₇—CH₃ | —NH—(CH₂)₇—CH₃ |
| 51 | 4-OH, 1-O—C(=O)—C₆H₅ phenyl | —NH—(CH₂)₇—CH₃ | —NH—(CH₂)₇—CH₃ |
| 52 | 4-OH, 1-O—C(=O)—NH—CH₃ phenyl | —O—C₆H₄—C(CH₃)₃ | —O—C₆H₄—C(CH₃)₃ |
| 53 | 4-OH, 1-O—CH₂—C₆H₅ phenyl | —O—C₆H₄—C(CH₃)₃ | —O—C₆H₄—C(CH₃)₃ |
| 54 | 4-OH, 1-O—CH₂—C(=O)OC₂H₅ phenyl | —O—C₆H₄—C(CH₃)₃ | —O—C₆H₄—C(CH₃)₃ |
| 55 | 4-OH, 1-O—C(=O)—CH₃ phenyl | —O—C₆H₄—C(CH₃)₃ | —O—C₆H₄—C(CH₃)₃ |
| 56 | 4-OH, 1-O—C₂H₅ phenyl | —S—(CH₂)₇—CH₃ | —S—(CH₂)₇—CH₃ |
| 57 | 4-OH, 1-O—(CH₂)₃—CH₃ phenyl | —S—(CH₂)₇—CH₃ | —S—(CH₂)₇—CH₃ |
| 58 | 4-OH, 1-O—(CH₂)₁₁—CH₃ phenyl | —S—(CH₂)₇—CH₃ | —S—(CH₂)₇—CH₃ |
| 59 | 4-OH, 1-O—(CH₂)₁₇—CH₃ phenyl | —S—(CH₂)₇—CH₃ | —S—(CH₂)₇—CH₃ |
| 60 | 4-OH, 1-O—CH₂—C₆H₅ phenyl | —S—(CH₂)₇—CH₃ | —S—(CH₂)₇—CH₃ |
| 61 | 4-OH, 1-O—CH₂—CH=CH₂ phenyl | —S—(CH₂)₇—CH₃ | —S—(CH₂)₇—CH₃ |
| 62 | 4-OH, 1-O—CH₂—C(=O)OC₂H₅ phenyl | —S—(CH₂)₇—CH₃ | —S—(CH₂)₇—CH₃ |
| 63 | 4-OH, 1-O—C(=O)—CH₃ phenyl | —S—(CH₂)₇—CH₃ | —S—(CH₂)₇—CH₃ |
| 64 | 4-OH, 1-O—C(=O)—C₆H₅ phenyl | —S—(CH₂)₇—CH₃ | —S—(CH₂)₇—CH₃ |

| No. | —R | —X—A | —X—B |
|---|---|---|---|
| 65 | 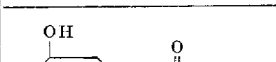 | —S—(CH₂)₇—CH₃ | —S—(CH₂)₇—CH₃ |
| 66 |  | —S—(CH₂)₇—CH₃ | 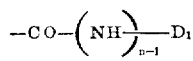 |
| 67 |  | —S—(CH₂)₇—CH₃ | 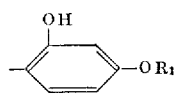 |
| 68 | 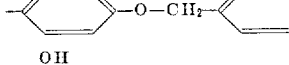 | —S—(CH₂)₇—CH₃ | 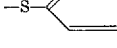 |

The new aryl-1,3,5-triazines of the general formula (2) can be prepared in a manner similar to the known processes, for example by reacting a dihalogenotriazine of the formula (69)

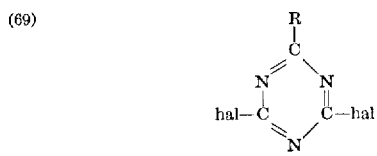

where R has the same meaning as in the Formula 2—with a corresponding compound H—X—A or H—X—B, in which X, A and B likewise have the same meanings as in the Formula 2.

Furthermore, aryl-1,3,5-triazines of the Formula 4 are advantageously manufactured by introducing in a cyanuric halide, with chlorine or bromine as the halogen, (a) the residue —X₁—A by reaction with 2 mols of a compound H—X₁—A and (b) introducing the residue

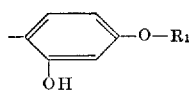

by reaction with 1 mol of a 2,4-dihydroxybenzene compound comprising at least one unsubstituted as-position, R₁ representing a hydrogen atom, an alkenyl group containing up to 9 carbon atoms, a possibly further substituted alkyl group, an aralkyl group, or a residue of the formula $$-CO-\left(NH\right)_{n-1}-D_1$$

in which n=1 or 2 and D₁ stands for an alkyl or cycloalkyl group or a possibly further substituted phenyl group, in the presence of a Friedel-Crafts catalyst, in an anhydrous organic solvent which is inert towards the reactants, the sequence in which these two substituents are introduced being optional, and, if desired, the hydroxyl group in para-position to the triazine ring is etherified, esterified or converted into a urethane group.

An advantageous manner of manufacturing compounds of the Formulae 5a to 5c consists in introducing in cyanuric chloride (a) the residue —O—A₁ by reaction with 2 mols of a compound of the formula H—O—A₁ and (b) the residue

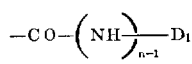

where R₁ represents a hydrogen atom an alkenyl group containing up to 9 carbon atoms, a possibly further substituted alkyl group, an aralkyl group, or a residue of the formula $$-CO-\left(NH\right)_{n-1}-D_1$$

(where n=1 or 2 and D₁ stands for an alkyl or cycloalkyl group or a possibly further substituted phenyl group) by reaction with 1 mol of a 2,4-dihydroxybenzene compound containing at least one unsubstituted as-position, in the presence of a Friedel-Crafts catalyst, in an anhydrous organic solvent which is inert towards the reactants, the sequence in which these two substituents are introduced being optional, and, if desired, the hydroxyl group in para-position to the triazine ring is etherified, esterified or converted into a urethane group.

In the afore-mentioned process it has proved advantageous to react first 2 mols of the compound H—O—A₁ with cyanuric chloride and then to introduce the residue

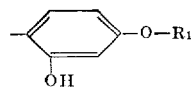

as described above.

The reaction of the process step (b) is preferably carried out with anhydrous aluminum chloride as Friedel-Crafts catalyst and in the presence of nitrobenzene or benzene, chlorobenzene, dichlorobenzene, carbon tetrachloride or the like as inert organic solvent at a temperature ranging from 0° to 150° C., depending on the reactivity of the reactants. Further suitable Friedel-Crafts catalysts are zinc chloride, stannic chloride or boron trifluoride. Whereas for the condensation partners normally approximately molar proportions (possibly a slight excess or short-fall of one component) are used, the Friedel-Crafts catalyst is generally used in an amount of about 0.8 to 1.5 mols.

Preferred compounds of the benzene series corresponding to the residue R to be used in this reaction are 2,6-dihydroxytoluene, 1,3,5-trihydroxybenzene and especially 1,3-dihydroxybenzene.

The reaction of the process step (a) is preferably conducted in an aqueous medium containing organic, water-miscible, inert solvents, in the presence of acid-acceptors. Suitable reaction media are aqueous media containing as water-miscible solvents, which are inert towards the reactants, substances such, for example, as acetone, dioxan or the like. Suitable acid-acceptors are alkali metal hydroxides, carbonates or the like. During the course of the reaction the pH value of the reaction medium should if possible not exceed 7, and preferably it should remain within the weakly acidic range.

A reaction temperature suitable for the exchange of the first triazine chlorine atom of cyanuric chloride is within the range from about 1° to 20° C., whereas for the exchange of the second chlorine atom a range from about 10° to 70° C. should be used. Acid-acceptors may be dispensed with when the compound H—X—A or H—X—B is used in the form of one of its metal salts, preferably of an alkali metal salt.

On the other hand, it is possible to work in an anhydrous medium when the reaction is performed in an inert solvent (for example mono-, di- or trichlorobenzene) at an elevated temperature (for example at 80 to 180° C.), advantageously in the presence of a small amount of aluminium chloride or in an equivalent of an acid-acceptor such as sodium bicarbonate.

From the large number of H—X—A and H—X—B compounds suitable for these reactions the following examples may be mentioned:

(a) Alcohols and phenols.—Methanol, octyl alcohol, octadecyl alcohol,

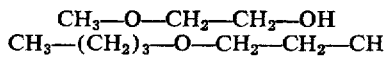

allyl alcohol, crotyl alcohol, cyclohexanol, benzyl alcohol, phenol, β-naphthol, α-tetrahydronaphthol, 4-hydroxy-3,5-di-tertiary butylphenol, ortho-cresol, 4-nonylphenol, 2-methyl-5-isopropylphenol (carvacrol), 2,4-di-tertiary butylphenol, pentamethylphenol, 2-methoxyphenol (guaiacol), 2-tertiary butyl-4-methoxyphenol, 2-methoxy-4-propenylphenol (isoeugenol), 2,4,6-tricarboxyphenol (gallic acid), 4-carbethoxyphenol, 3-diethylaminophenol, 2-carbaminophenol, 2-carbanilinophenol, 2,4,5-trichlorophenol, 2,4,6-tribromophenol, 4-chloro-3,5-dimethylphenol, 3-nitrophenol, 4-cyclohexylphenol, 4-phenylphenol and cumylphenol.

(b) Thioalcohols and thiophenols.—Thiophenol, ortho- and meta- and para-thiocresol, parachlorothiophenol, methylmercaptan, n-octylmercaptan, n-octadecylmercaptan, allylmercaptan, β-thionaphthol,

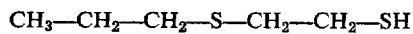

and benzylmercaptan.

(c) Amines containing at least one amine hydrogen atom. — Monomethylamine, isobutylamine, n-dodecylamine, n-octadecylamine, benzylamine, allylamine, diethylamine, ethyl-n-butylamine, 1-amino-2- or -4-chlorobenzene, aniline, 1-amino-2,4- or -3,4-dichlorobenzene, 1-amino-2-, -3- or -4-methylbenzene, 1-amino-2-methyl-5-isopropylbenzene, 1-amino-2-, -3- or -4-methoxybenzene, diphenylamine, N-methylphenylamine, N-n-butylphenylamine and morpholine.

According to an alternative variant of the process described above residues —X—A or —X—B may be obtained by exchanging them for other residues —X—A or —X—B already present in the molecule of the compounds of the Formula 2, that is to say, for example, by transesterifications, transamidations or the like, with other alcohols, amines, mercaptans, phenols or thiophenols in the presence of suitable catalysts, for example alkali metals, zinc chloride, alkali metal hydroxides, metal alcoholates or the like. In this manner it is possible, for example, to exchange quite easily an aryloxy radical for an alkoxy radical or to manufacture from esters —O—A in an advantageous manner compounds of the —NH—A type.

The substituent groups R, A and B introduced by the processes described above may be subjected to further reactions; especially valuable are further transesterifications of hydroxyl groups of the substituent R. For example, etherifications of such hydroxyl groups may give rise to industrially valuable products; an etherifying agent particularly suitable for this purpose is, for example, ethylene chlorohydrin, n-allylbromide, n-bromoctane, n-bromoctadecane, benzylchloride, para-chlorobenzylchloride, crotylbromide, γ-bromobutyronitrile, chloracetic acid ethyl ester, γ-bromobutyric acid ethyl ester, 1-chloro-3-bromopropane, phenacylbromide, bromacetic acid methyl ester, bromacetic acid or bromopropionic acid amide as well as dimethyl sulphate or diethyl sulphate.

Likewise there are of practical importance further reactions with isocyanates of the formula $D_1$—N=C—O where $D_1$ has the same meaning as in the Formula 3. As relevant examples there may be mentioned methylisocyanate, n-butylisocyanate, dodecylisocyanate, octadecylisocyanate, cyclohexylisocyanate, phenylisocyanate, para-ethoxyphenylisocyanate, para-chlorophenylisocyanate, ortho-tolylisocyanate and para-tolylisocyanate.

Acid halides and acid anhydrides suitable for a possible further reaction correspond, for example to the formulae

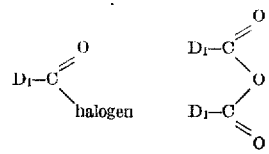

where $D_1$ has the same meaning as in the Formula 3.

As acid halides and acid anhydrides corresponding to the above formulae there may be mentioned, for example, those of the following acids: Acetic, butyric, stearic, benzoic, salicylic, para-chlorobenzoic, para-tertiary butylbenzoic and para-methoxybenzoic acid.

The new aryl-1,3,5-triazines of the present invention may be used as stabilizers to counteract the effects of light, atmospheric oxygen and heat for a wide variety of organic materials. Unexpectedly, the compounds defined above display in contrast to types of compounds chemically closely related with them a specific effect as antioxidants for high-molecular organic substances that undergo degradation on oxidation. By virtue of the fact that most of the substances of this invnteion at the same time act as light filters, especially against ultraviolet rays, they prove particularly valuable in a large variety of applications.

High-molecular organic substances that can be protected from oxidative attacks by means of the substances of this invention belong, for example, to the following types of substances:

Synthetic materials accessible by polymerization or copolymerization, for example polyacrylonitrile, polyvinylchloride or polyolefines such as polyethylene or polypropylene, or those which are accessible by polycondensation, such as polyesters and above all polyamides, and polyadducts such as polyurethanes.

Lacquers and films of diverse compositions, for example those from acetylcellulose, cellulose propionate, cellulose butyrate or cellulose mixtures, for example cellulose acetate-butyrate or cellulose acetate-propionate; furthermore nitrocelluloses, vinyl acetate, polyvinylchloride, polyvinylidenechloride; copolymers from vinylchloride and vinylidenechloride, alkyd lacquers, polyethylene, polypropylene, polyamides, polyacrylonitrile, polyesters, polycarbonates, polyurethanes and the like.

Natural, rubber-like materials such as rubber, balata, guttapercha or synthetic vulcanizable materials, such as polychloroprene, olefinic polysulphides, polybutadiene or copolymers of butadiene-styrene (for example Buna S) or butadiene-acrylonitrile (for example Buna N) which may also contain fillers, pigments, vulcanization accelerators and the like and in whose case the addition of the hydroxyphenyl-1,3,5-triazines is made to delay ageing and thereby to prevent changes in the plasticity and the embrittlement.

Cosmetic preparations such as perfumes, dyed or undyed soaps and bath salts, skin and face creams, powders, repellants and especially sunburn oils and creams. The new aryl-1,3,5-triazines may be incorporated with or applied to the substrates to be protected in various ways depending on the nature of the substrate concerned.

(1) For example when synthetic, organic, high-molecular substances are to be protected, they may be incorporated with these materials already in the final stage of the manufacturing process or during the working up operations. On the other hand, there is no difficulty involved in applying them superficially or in incorporating them during the production of the finished product from the semi-finished product.

(2) The protective agent may also be incorporated with a substrate in order to protect one or several other substances contained in the substrate, for example dyestuffs, auxiliaries or the like; this ensures at the same time the above-mentioned protection of the high-molecular organic material.

Finally, the protecting agent may be applied, especially to fibrous material of natural or synthetic origin, in any desired phase of the final processing, such as dressing, anti-crease finishing, dyeing process, finishing process or the like by a fixing operation similar to a dyeing process; this is particularly suitable in the case of textile materials.

Thus, the resulting process for protecting high-molecular organic substances from the harmful effects of light, heat and especially oxidative agencies is characterized in that new aryl-1,3,5-triazines of the Formula 2 are incorporated with or applied to the organic material to be protected itself or a substrate containing the said material.

The amount of stabilizer, especially light filter, to be incorporated with the organic material to be protected may vary within wide limits depending on the type of material to be treated, on the demands made on the efficacy and permanence and other factors: for example, it may be between about 0.01 and 10%, preferably from 0.1 to 2%, of the material that is to be directly protected from the harmful effects of heat, air and especially ultraviolet rays.

Unless otherwise indicated, parts and percentages in the following examples are by weight. Melting points are uncorrected.

EXAMPLE 1

66 parts of 2-chloro-4,6-di-(2'-methylphenoxy)-1,3,5-triazine (prepared from one equivalent of cyanuric chloride and two equivalents of ortho-cresol in an acetonic solution by addition of 2 equivalents of sodium hydroxide solution below pH 7 at 40° C.) and 27.5 parts of resorcinol in 350 parts of nitrobenzene are mixed at 0° to 5° C. with 40 parts of anhydrous aluminium chloride. The batch is stirred until it has reached 18 to 20° C. and then further stirred for 24 hours each at 18 to 20° C., at 40 to 45° C. and 60° C. The reaction mixture is then allowed to cool and poured over 1200 parts of water and 800 parts of ice. The organic phase is washed neutral with water, and the nitrobenzene is then expelled by steam distillation, to yield 70 parts of the compound of the formula (8)

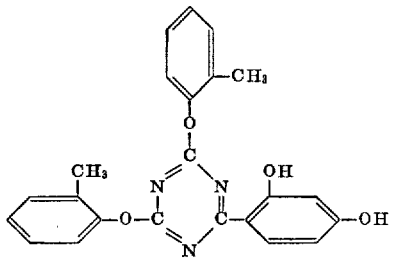

which, after 3 recrystallizations from benzenes, melts at 174 to 175° C. and reveals the following analytical values:

$C_{23}H_{19}O_4N_3$—Calculated: C, 68.81; H, 4.77; N, 10.47%. Found: C, 69.04; H, 4.78; N, 10.58%.

EXAMPLE 2

A solution of 16 parts of the compound of the Formula 8 in 150 parts of acetone is mixed with a solution of 2.5 parts of potassium hydroxide and 6.9 parts of potassium carbonate in 60 parts of water and the mixture is heated to 35° C. 8 parts of diethyl sulphate are then added and the whole is stirred for 4 hours at 35 to 40° C., 150 parts of alcohol are added and the mixture is cooled to 0° C., and suction-filtered. The dry filter residue (15 parts), the product of the formula (9)

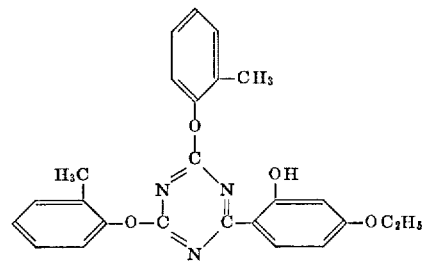

melts at 161 to 162° C. after one recrystallization from methylenechloride+alcohol.

Analytical data: $C_{25}H_{23}O_4N_3$—Calculated: C, 69.91; H, 5.40; N, 9.79%. Found: C, 70.12; H, 5.42; N, 9.95%.

EXAMPLE 3

The process described in Example 1, with omission of the temperature stage at 60° C., performed with 20.6 parts of 2 - chloro - 4,6 - di - (4' - para-tertiary butylphenoxy)-1,3,5-triazine and 6 parts of resorcinol in the presence of 8.7 parts of aluminium chloride and 80 parts of nitrobenzene, furnishes 20 parts of the compound of the formula (10)

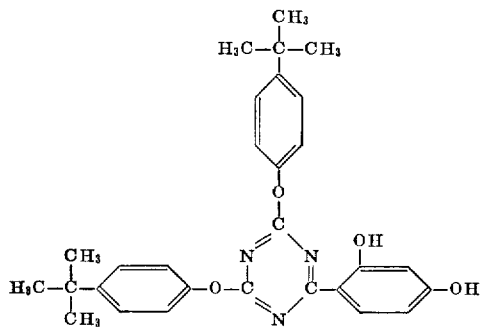

which, after two recrystallizations from gasoline (boiling at 110 to 120° C. under 760 mm. Hg pressure), melts at 201 to 202° C.

$C_{29}H_{31}O_4N_3$—Calculated: C, 71.72; H, 6.44; N, 8.65%. Found: C, 71.44; H, 6.35; N, 8.79%.

EXAMPLE 4

The reaction of 9.7 parts of the compound of the Formula 10 performed as described in Example 2 yields 7 parts of the compound of the formula (11)

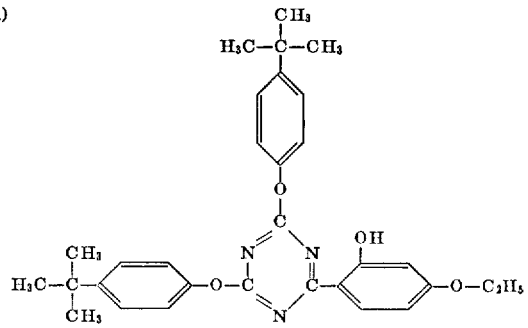

which melts at 174° to 175° C. and reveals the following analytical data:

$C_{31}H_{35}O_4N_3$—Calculated: C, 72.49; H, 6.87; N, 8.18%. Found: C, 72.75; H, 6.81; N, 8.02%.

EXAMPLE 5

The process described in Example 1, with omission of the temperature stage at 60° C., performed with 39.7 parts of 2-chloro-4,6-di-(2'-methyl-4'-chlorophenoxy)-1,3,5-triazine, 13.7 parts of resorcinol, 20 parts of aluminum chloride and 120 parts of nitrobenzene, furnishes 43 parts of the compound of the formula

(12)
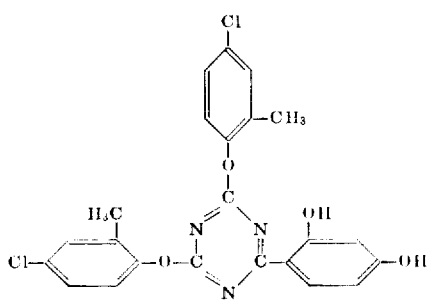

which melts at 219° to 220° C. after two recrystallizations from benzene.

$C_{23}H_{17}O_4N_3Cl_2$—Calculated: C, 58.74; H, 3.64; N, 8.93%. Found: C, 58.76; H, 3.91; N, 8.97%.

EXAMPLE 6

14 parts of the compound of the Formula 12, reacted as described in Example 2, yield 12 parts of the compound of the formula

(13)
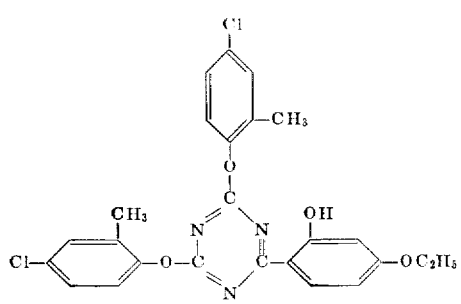

which after one recrystallization melts at 179° to 180° C.

$C_{25}H_{21}O_4N_3Cl_2$—Calculated: C, 60.25; H, 4.25; N, 8.43%. Found: C, 60.46; H, 4.33; N, 8.56%.

EXAMPLE 7

12 parts of the compound of the Formula 8 formed in Example 1 and 1.7 parts of potassium hydroxide are dissolved at 20° C. in 60 parts of dimethylsulphoxide and mixed with 4.4 parts of n-propylbromide. The batch is stirred for 3 hours at 20° to 25° C. and then for another 3 hours at 40° to 50° C. The resulting suspension is mixed with 150 parts of alcohol, cooled in an ice bath and then suction-filtered. The filter residue is successively washed with alcohol, N-hydrochloric acid and water and dried, to yield 11.4 parts of the compound of the formula

(70)
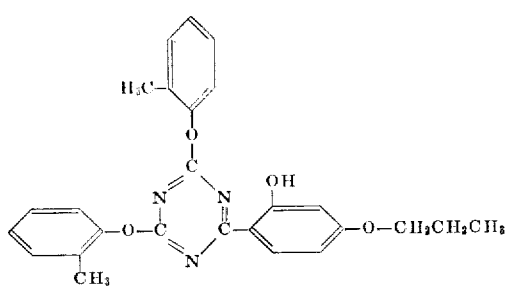

An analytically pure specimen recrystallized from methylenechloride+alcohol melts at 152 to 153° C. and reveals the following analytical data:

$C_{26}H_{25}O_4N_3$—Calculated: C, 70.41; H, 5.68; N, 9.48%. Found: C, 70.38; H, 5.67; N, 9.45%.

EXAMPLE 8

12 parts of the compound of the Formula 8 are suspended in 80 parts of chloro benzene; the mixture is heated to refluxing and 5.2 parts of butyric acid anhydride are added. The batch is stirred for 4 hours and 40 parts of chlorobenzene are distilled off under a water-jet vacuum. The remaining solution is mixed at 80° C. with 150 parts of boiling alcohol and allowed to cool slowly. The product which crystallizes out is suctioned off, rinsed with a small amount of alcohol and dried at 60° C. under vacuum, to yield 9.9 parts of the compound of the formula

(71)
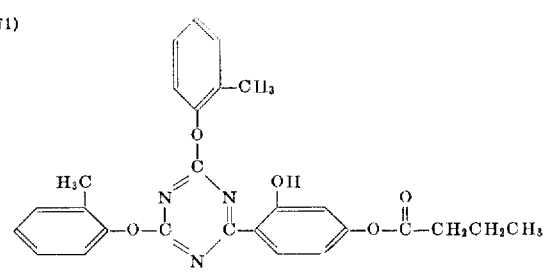

melting at 104 to 106° C., which reveals the following analytical data:

$C_{27}H_{25}O_5N_3$—Calculated: C, 68.78; H, 5.34; N, 8.91%. Found: C, 68.58; H, 5.61; N, 8.70%.

EXAMPLE 9

12 parts of the compound of the Formula 8 are dissolved at 18° to 20° C. in 80 parts of acetone and 25 parts of pyridine, and in the course of 30 minutes, at 20° to 25° C., 5.8 parts of para-chlorobenzoylchloride, diluted with 40 parts of acetone, are dropped in. The batch is then stirred for 10 hours at 18° to 20° C., for 6 hours at 45° C. and then for 6 hours under reflux. The cooled reaction mixture is poured into 750 parts of water. The whole is stirred in an ice bath until the separated oil has solidified; it is suctioned off and rinsed with water. The compound obtained after drying, corresponding to the formula

(72)
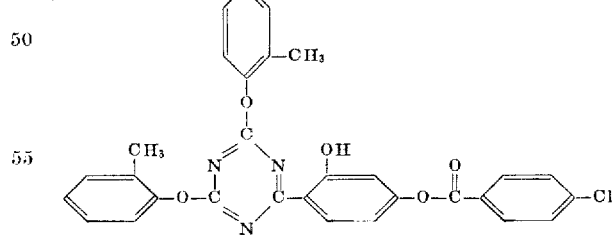

(14.5 parts) melts after recrystallization from methylenechloride+alcohol at 171 to 172° C. and reveals the following analytical data:

$C_{30}H_{22}O_5N_3Cl$—Calculated: C, 66.73; H, 4.11; N, 7.78%. Found: C, 66.73; H, 4.11; N, 7.62%.

The compounds listed in the following Table I contain further compounds as described in the preceding examples. The columns of the table contain the following details:

Column I—Formula N
Column II—Structural formula
Column III—Melting point in ° C. (uncorrected)
Column IV—Content of C, H, N in percent (first line—calculated; second line—found) empirical formula.

TABLE I

| I | II | III | IV |
|---|---|---|---|
| (15) | (structure: 2-(2,4-dihydroxyphenyl)-4,6-bis(4-methoxyphenoxy)-1,3,5-triazine) | 237–238 | 63.73  4.42  9.70<br>63.81  4.65  9.62<br>$C_{23}H_{19}O_6N_3$ |
| (16) | (structure: 2-(2-hydroxy-4-ethoxyphenyl)-4,6-bis(4-methoxyphenoxy)-1,3,5-triazine) | 169–170 | 65.07  5.02  9.11<br>65.00  5.08  9.03<br>$C_{25}H_{23}O_6N_3$ |
| (17) | (structure: 2-(2,4-dihydroxyphenyl)-4,6-bis(4-chloro-3,5-dimethylphenoxy)-1,3,5-triazine) | 291–292 | 60.25  4.25  8.43<br>60.21  4.35  8.33<br>$C_{25}H_{21}O_4N_3Cl_2$ |
| (18) | (structure: 2-(2-hydroxy-4-ethoxyphenyl)-4,6-bis(4-chloro-3,5-dimethylphenoxy)-1,3,5-triazine) | 195–196 | 61.71  4.79  8.00<br>61.25  4.76  8.16<br>$C_{27}H_{25}O_4N_3Cl_2$ |

TABLE I—Continued
| I | II | III | IV |
|---|---|---|---|
| (19) | 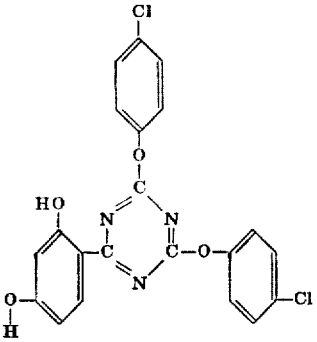 | 268–269 | 57.03 2.96 9.50<br>57.21 2.88 9.41<br>$C_{21}H_{13}O_4N_3Cl_2$ |
| (20) | 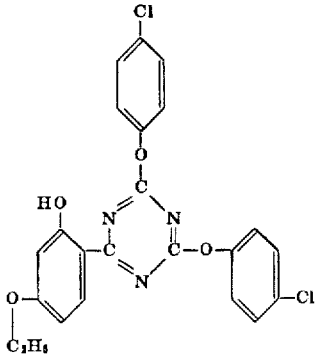 | 180–181 | 58.74 3.64 8.93<br>58.41 3.54 9.37<br>$C_{22}H_{17}O_4N_3Cl_2$ |
| (21) | 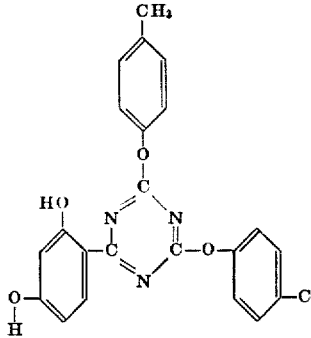 | 228–229 | 68.81 4.77 10.47<br>68.53 5.01 10.00<br>$C_{23}H_{19}O_4N_3$ |
| (22) | 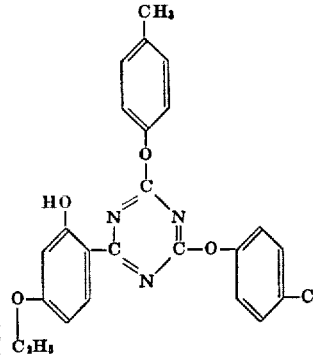 | 163–164 | 69.91 5.40 9.79<br>69.72 5.67 9.63<br>$C_{25}H_{23}O_4N_3$ |

TABLE I—Continued

| I | II | III | IV |
|---|---|---|---|
| (23) | 2,4-dihydroxyphenyl / diphenoxy-s-triazine | 229.5-230 | 67.55 4.05 11.26<br>67.30 4.12 11.51<br>$C_{21}H_{15}O_4N_3$ |
| (24) | 4-ethoxy-2-hydroxyphenyl / diphenoxy-s-triazine | 172-173 | 68.81 4.77 10.47<br>68.71 4.64 10.58<br>$C_{22}H_{19}O_4N_3$ |
| (25) | 2,4-dihydroxyphenyl / dimethoxy-s-triazine | 320-321 | 51.15 4.68 16.27<br>49.72 4.02 16.69<br>$C_{11}H_{11}O_4N_3 \cdot \tfrac{1}{2}H_2O$ |
| (26) | 2,4-dihydroxyphenyl / phenylthio / phenoxy-s-triazine | 209-210 | 62.20 3.73 10.36<br>62.50 3.77 10.46<br>$C_{21}H_{15}O_3N_3S_2$ |
| (27) | 2,4-dihydroxyphenyl / bis(3,4-dichlorophenoxy)-s-triazine | 205-206 | 49.35 2.17 8.22<br>49.56 2.37 8.16<br>$C_{21}H_{11}O_4N_3Cl_4$ |

TABLE I—Continued

| I | II | III | IV |
|---|---|---|---|
| (28) | 2,4-dihydroxyphenyl / bis(4-bromophenoxy)-s-triazine | 266–267 | 48.23  2.88  7.50<br>48.45  3.04  7.74<br>$C_{21}H_{13}O_4N_3Br_2 \cdot \tfrac{1}{2}CH_3COCH_3$ |
| (29) | 2,4-dihydroxyphenyl / bis(2,4-dibromophenoxy)-s-triazine | 200–201 | 36.61  1.61  6.10<br>36.72  1.71  6.03<br>$C_{21}H_{11}O_4N_3Br_4$ |
| (30) | 2,4-dihydroxyphenyl / bis(2,4,6-tribromophenoxy)-s-triazine | 156–157 | 31.78  1.89  4.63<br>32.13  2.11  4.77<br>$C_{21}H_9O_4N_3Br_6 \cdot (CH_3)_2CHOH$ |
| (73) | 2-hydroxy-4-isopropoxyphenyl / bis(2-methylphenoxy)-s-triazine | 103–105 | 72.49  6.87  8.18<br>72.23  6.76  8.29<br>$C_{31}H_{33}O_4N_3$ |

TABLE 1—Continued
| I | II | III | IV |
|---|---|---|---|
| (74) | 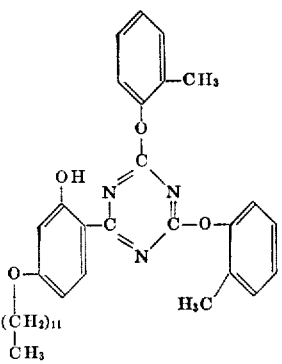 | 79–81 | 73.78  7.61  7.38<br>73.89  7.76  7.34<br>$C_{35}H_{43}O_4N_3$ |
| (75) | 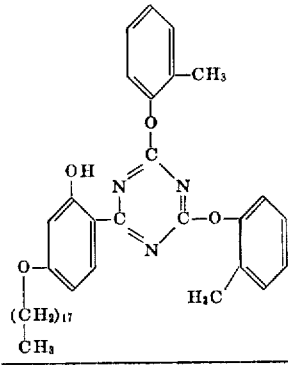 | 68–70 | 75.31  8.48  6.43<br>75.30  8.60  6.38<br>$C_{41}H_{55}O_4N_3$ |
| (76) | 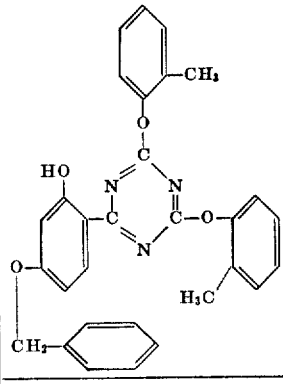 | 135–136 | 73.30  5.13  8.55<br>73.49  5.24  8.56<br>$C_{30}H_{25}O_4N_3$ |
| (77) | 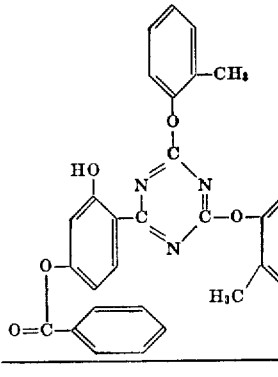 | 133–135 | 71.27  4.59  8.31<br>71.31  4.65  8.25<br>$C_{30}H_{23}O_5N_3$ |

TABLE 1—Continued

| I | II | III | IV |
|---|---|---|---|
| (78) | [structure: triazine with HO-phenyl, two o-tolyloxy groups, and O=C-C6H4-C(CH3)3 ester] | 135–137 | 72.71 5.56 7.48<br>72.61 5.56 7.43<br>$C_{34}H_{31}O_5N_3$ |
| (79) | [structure: triazine with HO-phenyl, two o-tolyloxy groups, and O=C-CH3 acetate ester] | 180–181 | 67.71 4.77 9.48<br>67.63 4.60 9.65<br>$C_{25}H_{21}O_5N_3$ |
| (80) | [structure: triazine with HO-phenyl, two o-tolyloxy groups, and O=C-(CH2)10-CH3 ester] | 78–79 | 72.01 7.08 7.20<br>72.17 7.12 7.26<br>$C_{35}H_{41}O_5N_3$ |
| (81) | [structure: triazine with HO-phenyl, two o-tolyloxy groups, and O-CH2-CH=CH2 allyl ether] | 137–138 | 70.73 5.25 9.52<br>70.63 5.27 9.62<br>$C_{26}H_{23}O_4N_3$ |

TABLE I—Continued

| I | II | III | IV |
|---|---|---|---|
| (82) | [structure: 4-chloro-2-methylphenoxy / methoxy-s-triazine with 2,4-dihydroxyphenyl] | 215–216 | 56.76  3.92  11.68<br>56.70  3.90  11.60<br>$C_{17}H_{14}O_4N_3Cl$ |
| (83) | [structure: 4-chloro-2-methylphenoxy / methoxy-s-triazine with 2-hydroxy-4-octyloxyphenyl] | 79.5–80 | 63.62  6.41  8.90<br>63.67  6.36  8.96<br>$C_{25}H_{30}O_4N_3Cl$ |
| (31) | [structure: bis(phenylthio)-s-triazine with 2-hydroxy-4-ethoxyphenyl] | 160–161.5 | 63.72  4.42  9.69<br>63.71  4.43  9.66<br>$C_{23}H_{19}O_2N_3S_2$ |

EXAMPLE 10

A paste prepared from 100 parts of polyvinylchloride, 59 parts of volume of dioctyl phthalate and 0.2 part of the compound of the Formula 8 is rolled into a foil on a calender heated at 150° to 155° C. The resulting polyvinylchloride foil absorbs completely in the ultraviolet region from 280 to 350 mµ.

The compound of the Formula 8 may be replaced by the compound of one of the following formulae: 9 to 30, 70, 71, 72, 73, 74, 75, 77, 78, 79, 80, 81, 87a, 87c, 89, 90, 91, 92, 93, 95, 97 or 98.

EXAMPLE 11

A mixture of 100 parts of polyethylene ("Alkathene WNG 14") and 0.2 part of the compound of one of the formulae: 9, 11, 13, 16, 18, 20, 22, 24, 74 or 75 is rolled to form a foil on a calender heated at 130° to 140° C. and then pressed at 130° C.

The resulting polyethylene foil is substantially impermeable to ultraviolet light within the region from 280 to 350 mµ.

EXAMPLE 12

A mixture of 100 parts of polypropylene and 0.2 part of the compound of one of the formulae: 8, 9, 10, 11, 12, 13, 20, 22, 24, 26 or 70 to 81 is converted into a sheet on a calender heated at 170° C. This sheet is then pressed at 230° to 240° C. under a maximum pressure of 40 kg. per sq. cm. to form a panel 1 mm. thick.

The resulting panels are impermeable to ultraviolet light within the region from 280 to 350 mµ. After 500 hours' exposure under a xenon lamp the panels have undergone no change in their absorptive capacity and display a substantially lesser embrittlement than is observed with panels that do not contain the compounds mentioned above.

EXAMPLE 13

A solution of 0.2 part of the compound of the Formula 13 in 1.8 parts of monostyrene is mixed with 0.5 part of a cobalt naphthenate solution in monostyrene (containing 1% of cobalt). 40 parts of an unsaturated polyester resin based on phthalic acid-maleic acid-ethyleneglycol in monostyrene are then added and the whole is stirred for 10 minutes; 1.7 parts of a catalyst solution (methylethyl ketone peroxide in dimethyl phthalate) are dropped in and the intimately stirred, air-free substance is poured in between two panes of glass. After about 20 minutes the 1 mm. thick panel has sufficiently solidified to enable it to be taken out of the mould. It is impermeable to ultraviolet light within the region from 280 to 350 mµ.

The compound of the Formula 13 may be replaced, for example, by the compound of one of the formulae: 8, 10, 11, 17, 19, 23, 26, 70, 71, 72, 73, 74, 76, 77, 78, 80 or 81.

EXAMPLE 14

11.75 parts of the compound of the formula

(12) 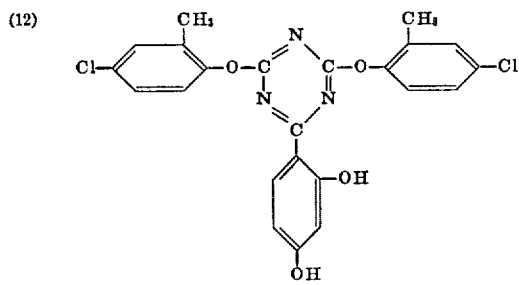

are dissolved in 100 parts of triethylamine and 2.5 parts of methylisocyanate are added to the clear solution. To complete the reaction the batch is heated to refluxing temperature then stirred until it is cold and 100 parts of petroleum ether are added. The precipitated product of the formula

(84) 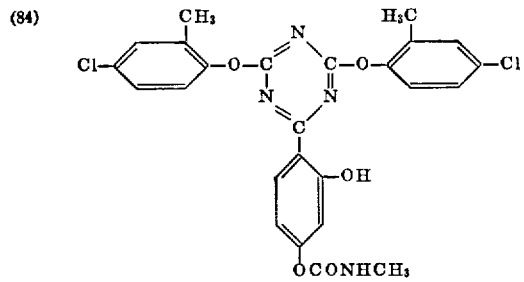

is suctioned off and washed with petroleum ether. Yield: 12.9 parts. Melting point: 177° to 181.5° C.
$C_{25}H_{20}O_5N_4Cl_2$ — Calculated: C, 56.94; H, 3.82; N, 10.62%. Found: C, 57.24; H, 3.83; N, 10.59%.

In a similar manner the following compounds are obtained:

(85) 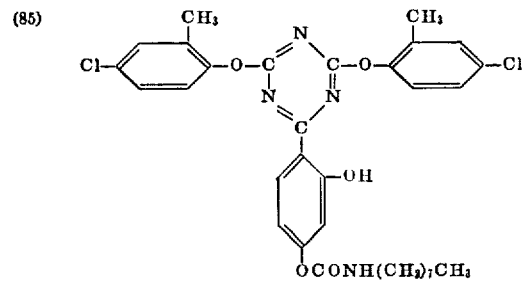

melting at 162° to 163.5° C.

$C_{32}H_{34}O_5N_4Cl_2$ — Calculated: C, 61.44; H, 5.48; N, 8.96%. Found: C, 61.48; H. 5.30; N, 8.89%.

(86) 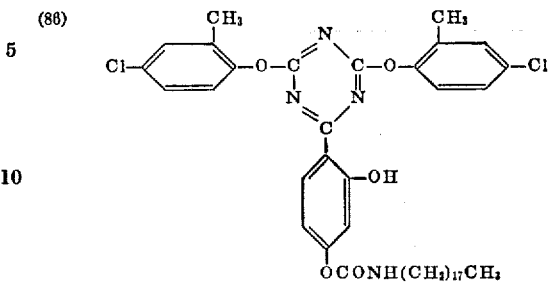

EXAMPLE 15

When the compound (25) in Table I is reacted as described in the preceding examples, compounds of the formula

(87) 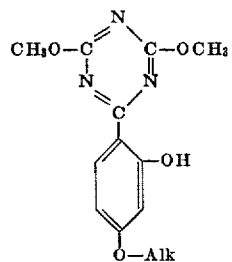

are obtained, namely the following alkyl esters:

| | M.P., °C. | Calc.<br>Found | C<br>C | H<br>H | N<br>N |
|---|---|---|---|---|---|
| | | $C_{15}H_{19}O_4N_3$ | | | |
| Alk=—$C_4H_9$ | 117.5–118.5 | | 59.00<br>58.99 | 6.27<br>6.14 | 13.76<br>13.71 |
| | | $C_{23}H_{35}O_4N_3$ | | | |
| Alk=—$(CH_2)_{11}CH_3$ | 88.5–90 | | 66.16<br>66.37 | 8.45<br>8.51 | 10.06<br>10.03 |
| | | $C_{29}H_{47}O_4N_3$ | | | |
| Alk=—$(CH_2)_{17}CH_3$ | 90.5–91.5 | | 69.42<br>69.68 | 9.44<br>9.30 | 8.38<br>8.22 |

EXAMPLE 16

The compounds listed in the following Table II were prepared as described in the preceding examples:

TABLE II

| I | II | III | IV |
|---|---|---|---|
| (88) | (structure with Cl, CH₃, HO, CH₃, Cl, OCH₃ groups on triazine) | 200–200.5 | 59.62  3.95  8.68<br>59.63  3.99  8.52<br>$C_{24}H_{18}O_4N_3Cl_2$ |

TABLE II—Continued

| I | II | III | IV |
|---|---|---|---|
| (93) | [Structure: triazine with 4-chloro-2-methylphenoxy, 2-methyl-4-chlorophenoxy, and 2-hydroxy-4-(CH₂COOC₂H₅)O-phenyl groups] | 135–135.5 | 58.28  4.17  7.55<br>58.08  4.10  7.48<br>$C_{27}H_{23}O_6N_2Cl_2$ |
| (94) | [Structure: triazine with 4-chloro-2-methylphenoxy, 2-methyl-4-chlorophenoxy, and 2-hydroxy-4-(OCH₂CH₂CH₂CN)-phenyl groups] | 145.5–146 | 60.34  4.13  10.43<br>60.07  4.12  10.37<br>$C_{27}H_{22}O_4N_4Cl_2$ |
| (95) | [Structure: triazine with 4-chloro-2-methylphenoxy, 2-methyl-4-chlorophenoxy, and 2-hydroxy-4-(OCOCH₃)-phenyl groups] | 197–197.5 | 58.61  3.74  8.20<br>58.43  3.74  8.21<br>$C_{25}H_{19}O_5N_3Cl_2$ |
| (96) | [Structure: triazine with 4-chloro-2-methylphenoxy, 2-methyl-4-chlorophenoxy, and 2-hydroxy-4-(OCO-phenyl)-phenyl groups] | 188.5–189.5 | 62.73  3.69  7.32<br>62.95  3.84  7.25<br>$C_{30}H_{21}O_5N_3Cl_2$ |

TABLE II—Continued
| I | II | III | IV |
|---|---|---|---|
| (89) | 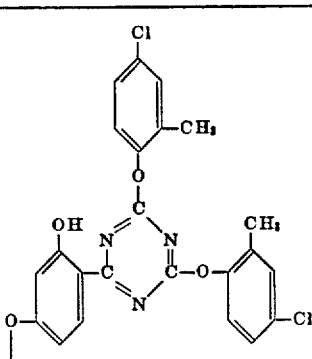 | 114–116 | 61.71 4.79 8.00<br>62.13 4.66 7.99<br>$C_{27}H_{25}O_4N_3Cl_2$ |
| (90) | 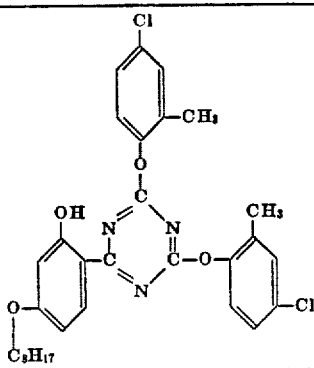 | 102–102.2 | 63.92 5.71 7.21<br>64.20 5.82 7.24<br>$C_{31}H_{33}O_4N_3Cl_2$ |
| (91) | 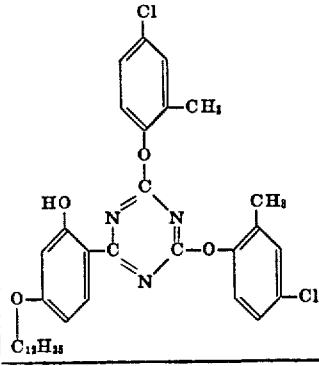 | 96–97.5 | 65.83 6.47 6.58<br>65.59 6.62 6.87<br>$C_{35}H_{41}O_4N_3Cl_2$ |
| (92) | 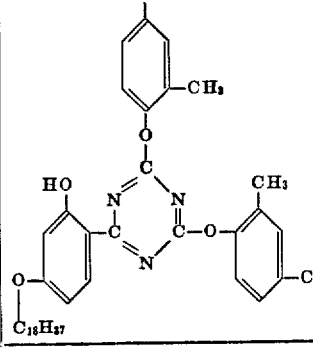 | 92–93 | 68.13 7.39 5.81<br>68.55 7.25 5.72<br>$C_{41}H_{53}O_4N_3Cl_2$ |

TABLE II—Continued

| I | II | III | IV |
|---|---|---|---|
| (97) | [structure: triazine with -O-phenyl(Cl)(CH₃), -O-phenyl(CH₃)(Cl), and phenyl with HO and OCO(CH₂)₆CH₃ substituents] | 111–111.5 | 62.42  5.24  7.04<br>62.55  5.33  7.01<br><br>$C_{31}H_{31}O_5N_3Cl_2$ |
| (98) | [structure: triazine with -O-phenyl(Cl)(CH₃), -O-phenyl(CH₃)(Cl), and phenyl with HO and OCO(CH₂)₁₆CH₃ substituents] | 92.5–93.5 | 66.84  6.98  5.70<br>67.08  6.86  5.78<br><br>$C_{41}H_{51}O_5N_3Cl_2$ |
| (99) | [structure: triazine with two -NH-C₆H₂(C(CH₃)₃)₂(OH) groups and one -C₆H₃(OH)(OH) group] | 287–288 | 70.78  7.87  11.16<br>70.53  7.73  11.20<br><br>$C_{37}H_{49}O_4N_5$ |
| (100) | [structure: triazine with two -NH-C₆H₂(C(CH₃)₃)₂(OH) groups and one -C₆H₃(OH)(OCH₃) group] | 313–314 | 71.11  8.01  10.91<br>70.87  7.85  10.89<br><br>$C_{38}H_{51}O_4N_5$ |

EXAMPLE 17

0.15 part of a triazine compound mixture prepared as described below is worked on a calender heated at 165° C. into 100 parts of a mixture of polypropylene. The mass is then pressed at 230° C. under 45 kg. per sq. cm. pressure to form panels 1 mm. thick. The resulting panels absorb ultra-violet light within the region from about 285 to 350 mµ.

The aforementioned triazine compound mixture was obtained in the following manner:

12 parts of the compound of the Formula 8 are etherified in 60 parts of dimethylsulphoxide with the addition of 1.8 parts of solid potassium hydroxide with 5.7 parts of 1-chloro-3-bromopropane by heating for 7 hours at 20° C., then for 16 hours at 35° C. and for 8 hours at 50 to 55° C., and the reaction mixture is then poured into water. When the precipitated product is recrystallized three times from hexane, there are obtained 6.5 parts of a product melting at 116° to 117° C. whose analysis reveals that it is a 4:1 mixture of the compounds of the following formulae:

(101)

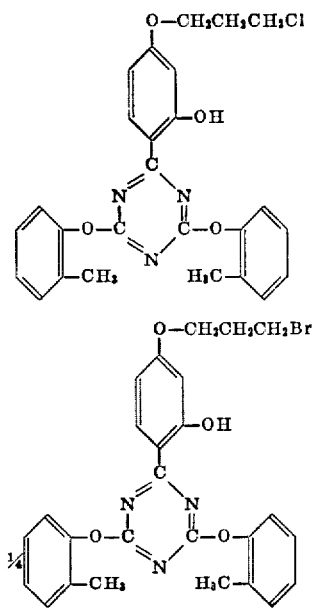

What is claimed is:
1. The symmetrically substituted aryl-1,3,5-triazine of the formula

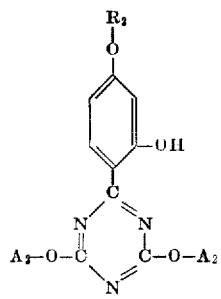

where $R_1$ represents a member selected from the group consisting of a hydrogen atom, an alkenyl group containing up to 4 carbon atoms, a benzyl group, an alkyl group containing up to 18 carbon atoms which may contain as substituent a member selected from the group consisting of a halogen atom, a nitrile group and a carboxylic acid alkyl ester group having 1–4 carbon atoms, and a residue of the formula

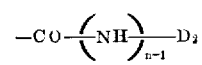

wherein $n=1$ to 2 and $D_2$ represents a member selected from the group consisting of an alkyl group containing 1 to 18 carbon atoms and a phenyl group which latter may be substituted by a member selected from the group consisting of a halogen atom and an alkyl group containing 1 to 4 carbon atoms, both groups $X_1$ are identical and each represents a member selected from the group consisting of an —O—, —S— and —NH— grouping, and where A represents a member selected from the group consisting of a methyl group, a benzene residue which may contain a member selected from the group consisting of one to two alkyl groups comprising 1 to 6 carbon atoms, up to 3 halogen atoms and a hydroxyl group.

2. The symmetrical aryl-1,3,5-triazine of the formula

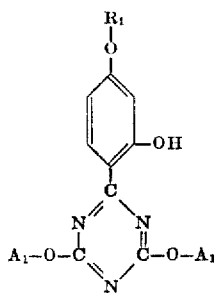

where $R_2$ represents a member selected from the group consisting of a hydrogen atom, an alkenyl group containing up to 4 carbon atoms, a benzyl group, an alkyl group, containing up to 18 carbon atoms which may contain as substituent a member selected from the group consisting of a halogen atom, a nitrile group and a carboxylic acid alkyl ($C_1$ to $C_4$) ester groups, and a residue of the formula

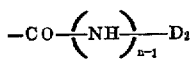

where $n=1$ to 2 and $D_2$ represents a member selected from the group consisting of an alkyl group containing 1 to 18 carbon atoms and a phenyl group which latter may be substituted by a member selected from the group consisting of a halogen atom and an alkyl group containing 1 to 4 carbon atoms, and where $A_2$ represents a member selected from the group consisting of a methyl group, a benzene residue which may contain a member selected from the group consisting of one to two alkyl groups comprising 1 to 6 carbon atoms, up to 3 halogen atoms and a hydroxyl group.

3. The aryl-1,3,5-triazine of the formula

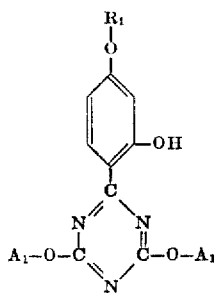

where $R_1$ represents a member selected from the group consisting of a hydrogen atom, an alkenyl group containing up to 9 carbon atoms, an alkyl group with up to 18 carbon atoms, an aralkyl group, or a residue of the formula $$-CO-(NH)_{n-1}-D_1$$

when $n=1$ to 2 and $D_1$ stands for a member selected from the group consisting of an alkyl group, a cycloalkyl group and a phenyl group and $A_1$ represents a phenyl group which may be substituted by a member selected from the group consisting of one to several halogen atoms, an alkyl group and an alkoxy group containing up to 12 carbon atoms.

4. The aryl-1,3,5-triazine of the formula

[Structure: triazine with O-R'₁ substituted phenyl bearing OH, and two C-O-A₁ groups]

where —O—R'₁ represents a member selected from the group consisting of a hydroxyl group, an alkoxy group containing up to 18 carbon atoms and a benzyloxy group, and $A_1$ a phenyl group which may be substituted by a member selected from the group consisting of one to several halogen atoms, an alkyl group and an alkoxy group containing up to 12 carbon atoms.

5. The symmetrical aryl-1,3,5-triazine of the formula

[Structure: triazine with O-R₂ phenyl bearing OH, and two o-cresyloxy (CH₃-phenyl-O-) groups]

where $R_2$ represents a member selected from the group consisting of a hydrogen atom, an alkenyl group containing up to 4 carbon atoms, a benzyl group, an alkyl group containing up to 18 carbon atoms which may be substituted by a member selected from the group consisting of a halogen atom, a nitrile group, a carboxylic acid alkyl ($C_1$ to $C_4$) ester group and a residue of the formula $$-CO-(NH)_{n-1}-D_2$$

where $n=1$ to 2 and $D_2$ stands for a member selected from the group consisting of an alkyl group containing 1 to 18 carbon atoms and a phenyl group which latter may be substituted by a member selected from the group consisting of a halogen atom and an alkyl group containing 1 to 4 carbon atoms.

6. The symmetrical aryl-1,3,5-triazine of the formula

[Structure: triazine with central O-R₃-phenyl-OH group and two symmetric NH-phenyl groups bearing (CH₃)₃C substituents and OH]

where $R_3$ respresents a member selected from the group consisting of a hydrogen atom and an alkyl group containing 1 to 4 carbon atoms.

7. The compound of the formula

[Structure: triazine with two OCH₃ groups and phenyl bearing OH and O-C₄H₉]

8. The compound of the formula

[Structure: triazine with three substituted phenyl groups bearing Cl, CH₃, OH, OCH₃ substituents]

9. The compound of the formula

[Structure: triazine with C₂H₅-O-phenyl-OH and two o-cresyloxy groups]

10. The compound of the formula
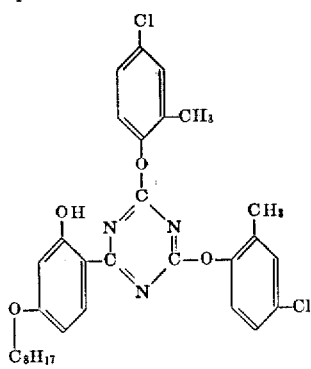
11. The compound of the formula
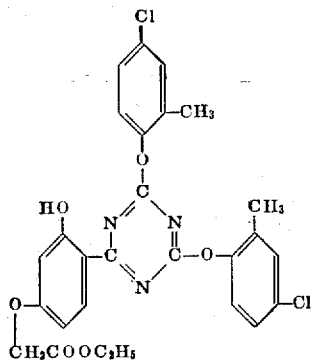
References Cited
UNITED STATES PATENTS
3,053,796  9/1962  D'Alelio _____ 260—248 XR
3,278,534  10/1966 Schellenbaum et al. __ 260—249.5
JOHN D. RANDOLPH, *Primary Examiner.*
J. M. FORD, *Assistant Examiner.*

UNITED STATES PATENT OFFICE
CERTIFICATE OF CORRECTION

Patent No. 3,397,205                             August 13, 1968

Christian Luethi et al.

It is certified that error appears in the above identified patent and that said Letters Patent are hereby corrected as shown below:

Column 45, line 5, the formula should appear as shown below:

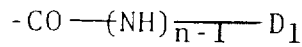

same column 45, lines 50 to 55, the lower right-hand portion of the formula should appear as shown below:

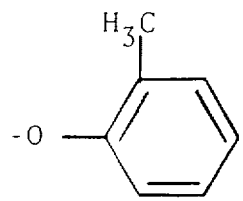

Signed and sealed this 13th day of January 1970.

(SEAL)
Attest:

EDWARD M. FLETCHER, JR.                    WILLIAM E. SCHUYLER, JR.
Attesting Officer                              Commissioner of Patents